(12) United States Patent
Noda

(10) Patent No.: US 6,777,074 B2
(45) Date of Patent: Aug. 17, 2004

(54) COMPOSITE CONSTRUCTION

(75) Inventor: Kenji Noda, Sendai (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 10/302,772

(22) Filed: Nov. 21, 2002

(65) Prior Publication Data
US 2003/0134135 A1 Jul. 17, 2003

(30) Foreign Application Priority Data

Nov. 22, 2001 (JP) .................................... 2001-358397
Mar. 22, 2002 (JP) .................................... 2002-081864

(51) Int. Cl.$^7$ .............................................. C22C 29/00
(52) U.S. Cl. ..................... 428/325; 428/212; 428/469; 428/472; 428/698
(58) Field of Search ............................. 428/212, 325, 428/469, 472, 698, 323

(56) References Cited

U.S. PATENT DOCUMENTS 5,672,382 A * 9/1997 Lux
5,932,348 A * 8/1999 Li
6,063,502 A   5/2000 Sue et al.

FOREIGN PATENT DOCUMENTS

JP      11-139884      5/1999

OTHER PUBLICATIONS english translation of JP 11–139884.*

* cited by examiner

Primary Examiner—Archene Turner
(74) Attorney, Agent, or Firm—Hogan & Hartson, LLP

(57) ABSTRACT

The composite construction of the present invention comprises a continuous core material 4 made of a polycrystalline diamond (PCD) obtained by bonding diamond particles 2, 2 with an iron group metal 3; and a shell layer 8 made of a sintered body obtained by bonding hard particles 6 with an iron group metal 7; wherein an amount of the iron group metal 3 in the core material 4 is larger than that of the iron group metal 7 in the shell layer 8.

18 Claims, 8 Drawing Sheets

COMPOSITE CONSTRUCTION

FIELD OF THE INVENTION

The present invention relates to a composite construction made of a sintered body obtained by coating the outer periphery of a core material with a shell layer.

BACKGROUND OF THE INVENTION

Ceramics and cermets obtained by bonding crystal grains with a bonding phase have hitherto been known. For example, a sintered body obtained by bonding hard particles such as carbides, nitrides, carbonitrides of metals of Groups 4a, 5a and 6a of the Periodic Table, diamonds or cubic boron nitride with an iron group metal is used as cutting tools, mining applications and wear-resistant parts by controlling the contents of the crystal grains having a high hardness and the iron group metal having a high toughness. It has generally been known that, in conventional hard materials described above, the hardness has an inverse proportional relationship relative to the toughness and it is hard to overcome both high hardness and high toughness. Particularly, a polycrystalline diamond (hereinafter, PCD) had a problem such as low chipping resistance when used in cutting tools, although it has high hardness but has low toughness and low impact resistance.

Therefore, there has been studied a technique of improving the toughness, in addition to the hardness and the strength of a construction, by coating the outer periphery of a continuous core material such as fibers with the other materials. For example, Japanese Unexamined Patent Publication (Kokai) No. 11-139884 discloses a ceramic composite obtained by spraying a second phase component over the outer periphery of each core material (linear ceramics), binding plural coated core materials into a bundle in a uniaxial direction, and compressing and sintering the bundle, and thus increasing the fracture resistance of the construction.

Although a composite construction, which is obtained by coating PCD as a core material with a shell material, for example, a sintered alloy such as cemented carbide (WC) containing metals of Groups 4a, 5a and 6a of the Periodic Table as a main component, is proposed, it is not studied about a composition which can overcome both high hardness and high toughness. Furthermore, even if PCD is merely combined with the sintered alloy, cracks and delamination partially occur sometimes at an interface between the core and the shell, which leads to low toughness, because of a large difference in thermal expansion coefficient between diamonds of the core material and hard particles as the main component of the shell layer.

U.S. Pat. No. 6,063,502 discloses that a composite construction is manufactured by coating the outer periphery of a core material made of a high hardness sintered body such cermet (for example, WC—Co), PCD or polycrystalline cubic boron nitride (PcBN) with a high toughness sintered body having a composition different from that of the core material, and thus the fracture resistance of the construction is increased to enhance the toughness without lowering the hardness. However, in the composite construction described in U.S. Pat. No. 6,063,502, in case the component, which is finally converted into a bonding phase as a result of the appearance of a liquid phase, exists in the core material and/or the shell layer, the liquid phase diffuses toward the core material and the shell layer. As a result, the core material has the same characteristics as those of the shell layer and thus the effect of improving the toughness disappears. In case the sintering temperature of the core material drastically differs from that of the shell layer, there was a problem that the liquid phase component moves from the portion having a high sintering temperature to the portion having a low sintering temperature and the portion having a low sintering temperature can not be densificated, an thus a large number of holes (voids) are remained.

SUMMARY OF THE INVENTION

A main object of the present invention is to provide a composite construction which has both high hardness and high toughness.

Another object of the present invention is to provide a composite construction which can easily attain desired characteristics.

(First Composite Construction of the Present Invention)

The present inventors have found that, when using PCD as a core material, a difference in thermal expansion coefficient between PCD and a sintered body as a shell layer, can be reduced by controlling an amount of an iron group metal in PCD to the amount larger than that in the shell layer, and thus obtaining a composite construction which has both high hardness and high toughness.

The composite construction of the present invention is characterized by a composite construction comprising a continuous core material made of PCD obtained by bonding diamond particles with an iron group metal; and a shell layer made of a sintered body obtained by bonding at least one kind of hard particles, which are selected from the group consisting of carbides, nitrides and carbonitrides of at least one kind of metal elements (M) selected from the group consisting of metals of Group 4a, 5a and 6a of the Periodic Table, with an iron group metal, the outer periphery of the core material being coated with the shell layer; wherein an amount of the iron group metal in the core material is larger than that of the iron group metal in the shell layer.

(Second Composite Construction of the Present Invention)

Also the present inventors have found that, by providing an intermediate layer capable of preventing infiltration or diffusion of a bonding phase between a core material and a shell layer of a construction, the compositions of the core material and the shell layer can be easily controlled and a sound fine sintered body free from pores can be manufactured, and thus obtaining a composite construction which can easily attain desired characteristics such as high hardness and high toughness.

The composite construction of the present invention comprises a continuous core material; and a shell layer having a composition different from that of the core material, the outer periphery of the core material being coated with the shell layer; wherein at least one of the core material and the shell layer is made of a sintered body obtained by bonding crystal grains with a bonding phase and at least one intermediate layer, which has a region in which the content of the bonding phase gradually decreases toward the inside from at least one of the core material and the shell layer, is provided between the core material and the shell layer.

Other objects and advantages of the present invention will become apparent from the following detailed description.

DETAILED DESCRIPTION OF THE INVENTION (First Composite Construction)

The first composite construction of present invention will be described with reference to FIG. 1 and FIG. 2.

Figure 1A:
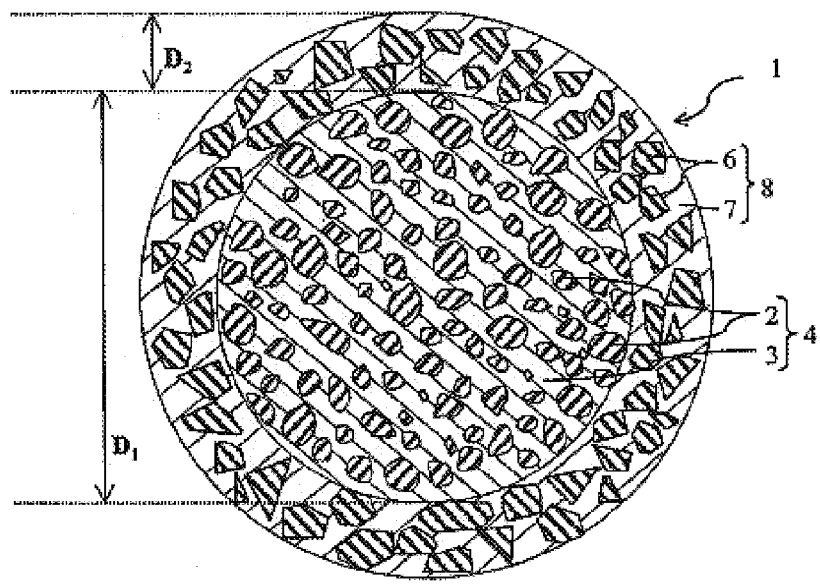
FIG. 1(a) is a schematic sectional view showing an embodiment of a first composite construction according to the present invention.
Figure 1B:
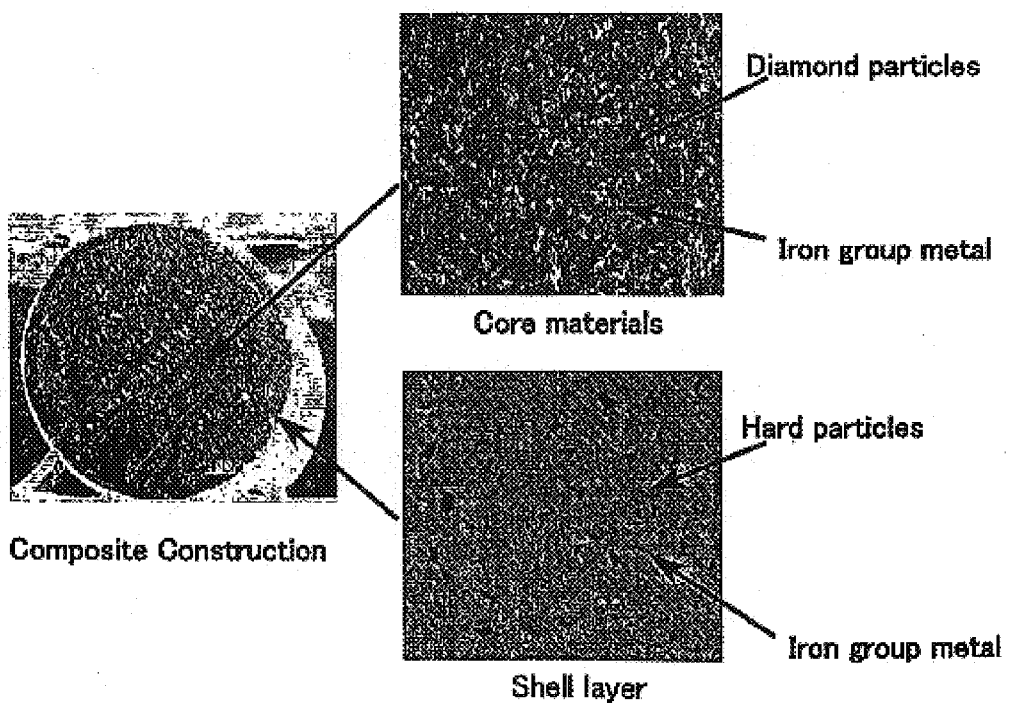
FIG. 1(b) is a micrograph thereof

Referring to FIG. 1, a composite construction 1 has such a structure that the outer periphery of a continuous core material 4 made of PCD obtained by bonding diamond particles 2, 2 with an iron group metal 3 is coated with a shell layer 8 made of a sintered body obtained by bonding at least one kind of hard particles 6, which are selected from the group consisting of carbides, nitrides and carbonitrides of at least one kind of metal elements (M) selected from the group consisting of metals of Group 4a, 5a and 6a of the Periodic Table, with an iron group metal 7.

A significant feature of the present invention is that an amount of the iron group metal 3 in the core material (PCD) 4 is larger than that of the iron group metal 7 in the shell layer (sintered body) 8, thereby making it possible to reduce a difference in thermal expansion coefficient between the core material and the shell layer, and thus obtaining a composite construction which has both high hardness and high toughness. As used herein, the amount of the iron group metal refers to the total of a peak intensity of the iron group metal in wave length dispersive X-ray spectroscopy of a cross section of the composite construction 1. Particularly, a ratio of the amount (Md) of the iron group metal 3 in the core material (PCD) 4 to the amount (c) of the iron group metal 7 in the shell layer(sintered body) 8, (Md/Mc), is preferably 1.2 or more, and more preferable from 1.5 to 100.

According to the present invention, an average particle diameter $d_1$ of the diamond particles 2 is preferably 3.5 μm or less, and particularly preferably from 0.01 to 2.5 μm, in order to improve a fracture toughness value of the composite construction by controlling the amount of the iron group metal 3 in the core material (PCD) 4 and the amount of the iron group metal 7 in the shell layer(sintered body) 8 to a predetermined value. Furthermore, a ratio of an average particle diameter $d_1$ of the diamond particles 2 to an average particle diameter $d_2$ of the hard particles 6, $(d_1/d_2)$, is preferably within a range from 0.001 to 1.0, more preferably from 0.01 to 0.9, and most preferably from 0.05 to 0.8. Consequently, since an impregnation power of the iron group metal 3 as the bonding material can be enhanced by increasing a capillary force of the core material (PCD) 4 as compared with that of the shell layer (sintered body) 8, distribution of the iron group metal can be shifted to PCD side by sufficiently penetrating the iron group metal melted during sintering. When the average particle diameter $d_1$ of the diamond particles is controlled to 3.5 μm or less or the ratio of the average particle diameter $d_1$ of the diamond particles to the average particle diameter $d_2$ of the hard particles, $(d_1/d_2)$, is controlled within a range from 0.001 to 1.0, the fracture toughness value of the composite construction can be controlled to 20 MPa√m or more.

Even if $d_1/d_2$ is larger than 1.0, the amount of the iron group metal in the core material can be increased as compared with that of the iron group metal in the sintered body by controlling the amount of the iron group metal to a predetermined ratio, so that the amount of the iron group metal in PCD is larger than the amount of the iron group metal in the shell layer, and controlling the sintering temperature to a temperature lower than 1400° C., or providing an intermediate layer, which prevents diffusion of the iron group metal from one of the core material and the shell layer to the other one, between the core material and the shell layer, thereby to prevent diffusion of iron group metal during sintering. The intermediate layer includes, for example, an intermediate layer provided in the second composite construction described hereinafter, that is, an intermediate layer, which has a region in which the content of the iron group metal gradually decreases toward the inside from at least one of the core material and the shell layer. Such an intermediate layer may be provided between the core material and the shell layer not only in case $d_1/d_2$ is more than 1.0, but also in case $d_1/d_2$ is within a range from 0.001 to 1.0.

Figure 2A:
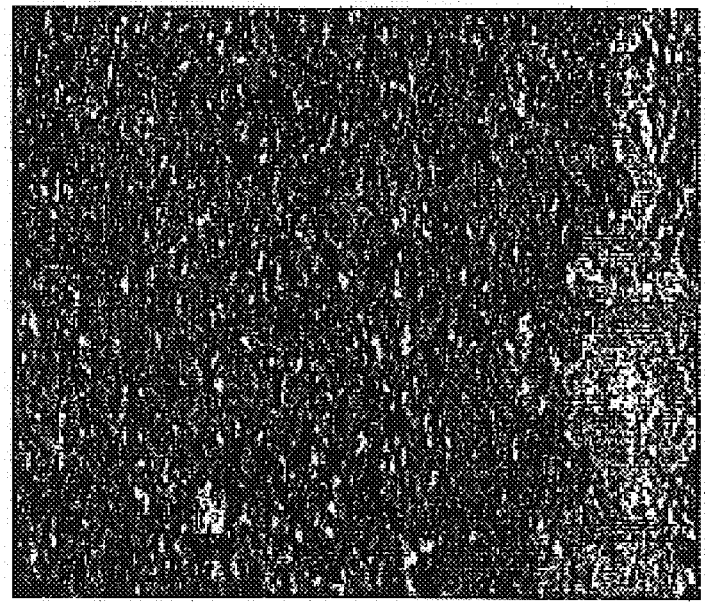
FIG. 2(a) is a micrograph of the composite construction of FIG. 1.
Figure 2B:
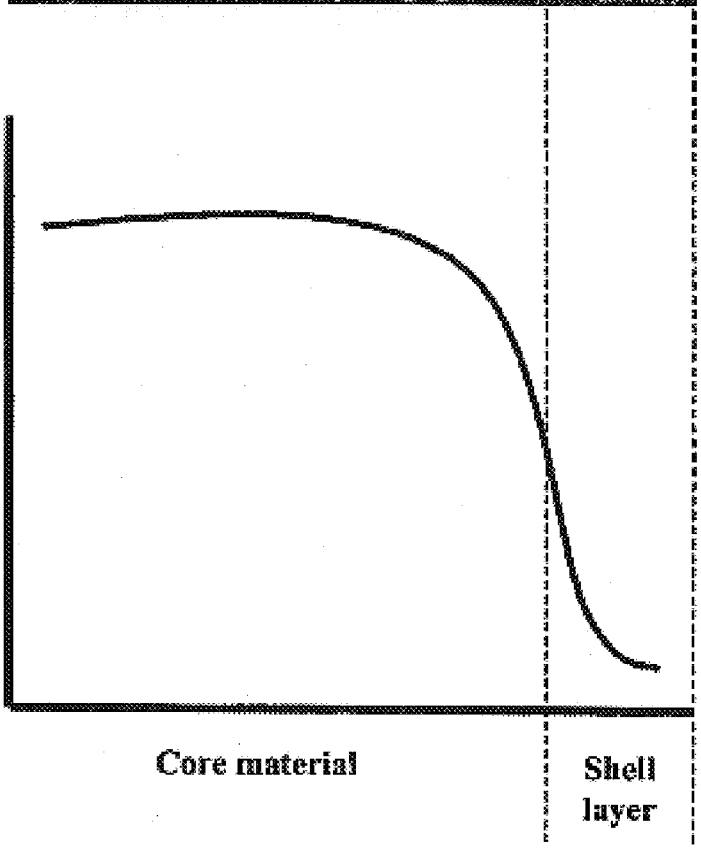
FIG. 2(b) is a graph showing the results of wave length dispersive X-ray spectroscopy of the composite construction.

For the purpose of enhancing the adhesion at an interface between the core material 4 and the shell layer 8 and avoiding local stress concentration, as shown in distribution of the amount of the iron group metal of FIG. 2, the content of the iron group metal 3 preferably decreases toward the shell layer 8 from the core material 4, gradually, in other words, continuously or stepwise.

For example, the average diameter of the core material 4 is 500 μm or less, and particularly from 2 to 200 μm, while the average thickness of the shell layer 8 is 500 μm or less, particularly from 0.1 to 200 μm. In order to attain the hardness of 50 GPa or more and the toughness of 18 MPa√m or more, a ratio of an average diameter $D_1$ of the core material 4 to an average thickness $D_2$ of the shell layer 8, $D_2/D_1$, is preferably from 0.01 to 0.5, and particularly preferably from 0.02 to 0.2.

Figure 3:
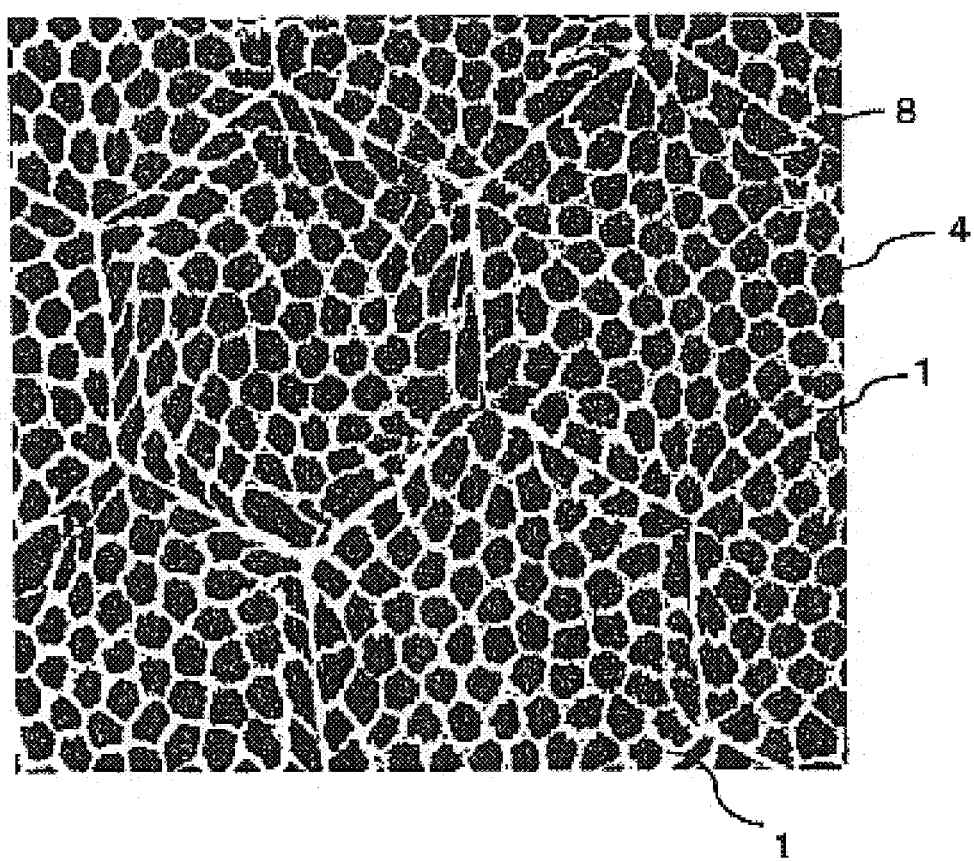
FIG. 3 is a micrograph showing another embodiment of the first composite construction according to the present invention.

Although the case wherein the outer periphery of one core material 4 is coated with the shell layer 8 was illustrated with reference to FIG. 1, the present invention is not limited to the case and, as shown in FIG. 3, the composite construction 1 may be a composite construction having a multi-filament structure wherein plural (for example, four or more) composite constructions shown in FIG. 1 are bound into a bundle.

(Manufacturing Method)

Figure 4:
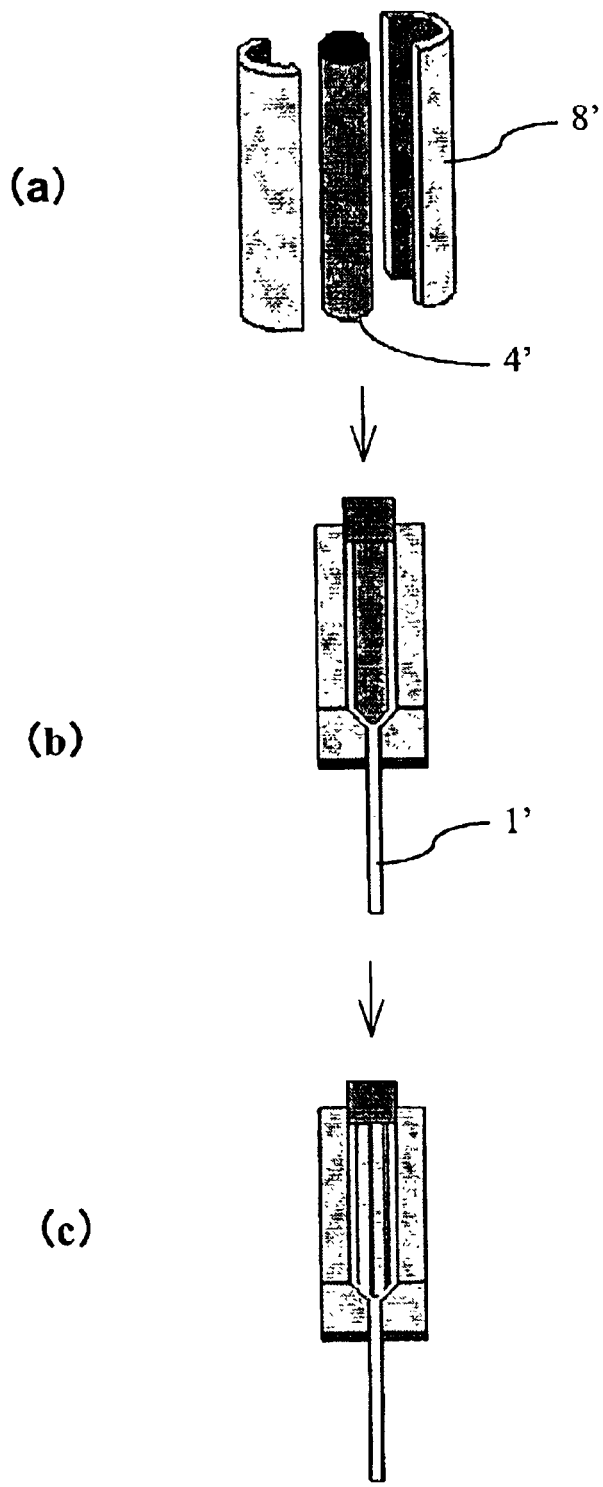
FIG. 4 is a process chart for explaining a method of manufacturing the first composite construction according to the present invention.

The method of manufacturing a first composite construction according to the present invention will be described with reference to the process chart shown in FIG. 4.

First, 50% by weight or more of a diamond powder having an average particle diameter of 0.01 to 3.5 μm is mixed with 50% by weight or less of an iron group metal powder having an average particle diameter 10 μm or less and an organic binder such as paraffin wax, polystyrene, polyethylene, ethylene-ethyl acrylate, ethylene-vinyl acetate, polybutyl methacrylate, polyethylene glycol or dibutyl phthalate is added to the mixture. After kneading the mixture, a cylindrical green body 4' for core material is formed from the kneaded mixture by a forming method such as pressing, extrusion or slip casting (step (a)).

Furthermore, 70 to 95% by weight of hard particles having an average particle diameter 0.02 to 10 μm or a hard particles-forming component is mixed with 5 to 30% by weight of an iron group metal powder having an average particle diameter of 10 μm or less and the above-mentioned binder was added. After kneading the mixture, two half-cut cylindrical green bodies 8' for shell layer are formed from the kneaded mixture by a forming method such as pressing, extrusion or slip casting and a composite green body comprising the half-cut cylindrical green bodies 8' for shell layer disposed to cover the outer periphery of the green body 4' for core material is formed (step (a)).

The composite green body is co-extruded to form a stretched composite green body 1' having a fine diameter, wherein the outer periphery of the core material 4' is coated with the shell layer 8' (step (b)).

To manufacture a construction having a multi-filament structure, plural co-extruded continuous green bodies may be co-extruded again after binding into a bundle (step (c)).

Furthermore, the stretched continuous green body can be formed into a cylindrical shape, or a prism shape such as triangular prism, quadratic prism or hexagonal prism, if necessary. Also a laminate can be manufactured by arranging the continuous green bodies to form a sheet and laminating plural sheets. At this time, the sheets may be laminated so that continuous green bodies of adjacent sheets are parallel to each other, or perpendicularly intersect or intersect at a predetermined angle (for example 45°). Also the continuous green body can be formed into arbitrary shape by a forming method such as known rapid proto-typing method. Furthermore, the sheet obtained by the arrangement or a composite construction sheet obtained by slicing the sheet in a cross-sectional direction can be laminated or bonded to the surface of a hard alloy sintered body (bulk body) such as conventional cemented carbide.

A first composite construction 1 of the present invention can be manufactured by subjecting the green body to a binder burn-out treatment and then to ultrahigh pressure sintering. According to the present invention, sintering is preferably carried out under the sintering conditions of a pressure of 4 GPa or more and a temperature of 1300° C. or higher for 5 minutes to 1 hour in order to control the amounts of the iron group metal of the core material 4 and the shell layer 8 within a predetermined range. In case a ratio of an average particle diameter $d_1$ of the diamond particles 2 to an average particle diameter $d_2$ of the hard particles 6, ($d_1/d_2$), is within a range from 0.01 to 1.0, the temperature is preferably within a range from 1400° C. to 1800° C. On the other hand, in case the ratio is larger than 1.0, the temperature is preferably lower than 1400° C.

As described in detail herein above, according to the first composite construction of the present invention, by controlling the amount of the iron group metal in PCD as the core material to the amount larger than that in the sintered body as the shell layer, a difference in thermal expansion coefficient between PCD and the shell layer can be reduced, and thus obtaining a composite construction which can overcome both high hardness and high toughness.

(Second Composite Construction)

The second composite construction of the present invention will be described with reference to FIG. 5.

Figure 5:
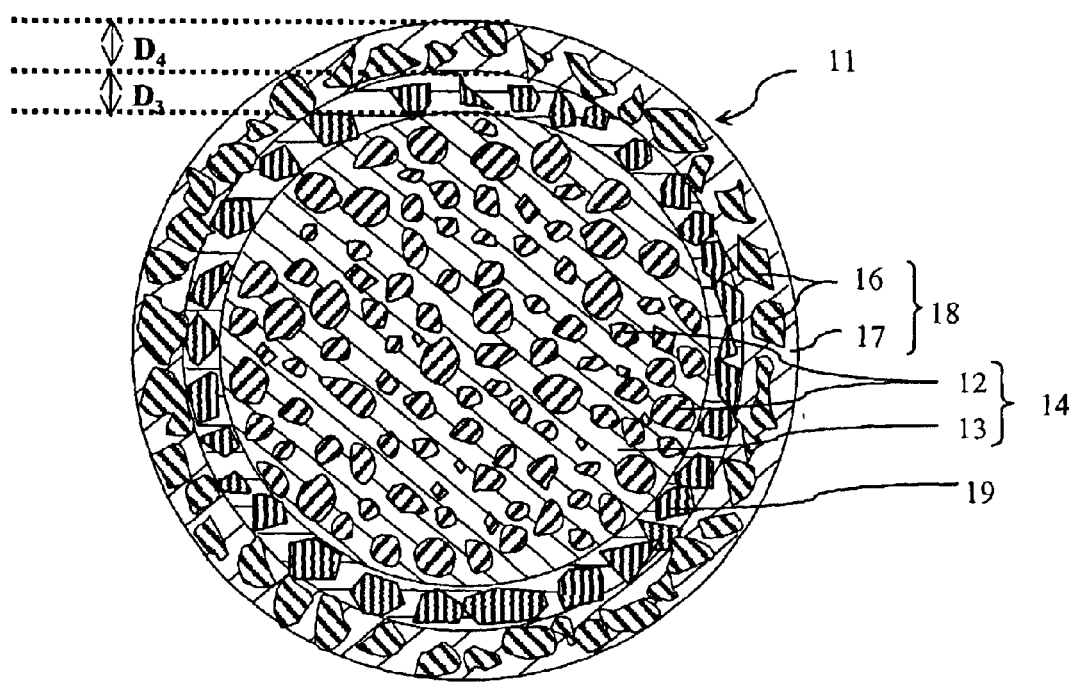
FIG. 5 is a schematic sectional view showing an embodiment of a second composite construction according to the present invention.

Referring to FIG. 5, a composite construction 11 has such a structure that the outer periphery of a continuous core material 14 made of a hard sintered body obtained by bonding crystal grains 12, 12 with a bonding phase 13 is coated with a shell layer 18 made of a hard sintered body obtained by bonding crystal grains 16 having a different composition with a bonding phase 17.

A significant feature of the present invention is that an intermediate layer 19, which has a region in which the content of the bonding phase 13, 17 gradually decreases from the core material 14 and the shell layer 18, is provided between the core material 14 and the shell layer 18, thereby making it possible to easily control the compositions of the core material 14 and the shell layer 18 and to manufacture a sound dense sintered body free from pores, and thus easily realizing a composite construction 11 having desired characteristics such as high hardness and high toughness.

With the above constitution, since the intermediate layer 19, which is made of a material having low wettability with the bonding phases 13, 17 contained in both or either of the core material and the shell layer and low diffusion coefficient (i.e. material having low affinity), or which is made of a material capable of preventing penetration of a liquid phase by producing the reaction product before the appearance of the liquid phase, is provided between the core material 14 and the shell layer 18. Accordingly, diffusion of the bonding phases 13, 17 between the core material 14 and the shell layer 18 can be prevented (that is, diffusion of the bonding phases 13, 17 toward one of the core material 14 and the shell layer 18 to the other one can be prevented) during sintering, and both of the core material 14 and the shell layer 18 can be densificated without deteriorating the sinterability and, furthermore, characteristics of the core material 14 and the shell layer 18 can be controlled to the desired characteristics by the amount of the bonding phase 13 in the core material 14 and the amount of the bonding phase 17 in the shell layer 18, easily and accurately. Consequently, characteristics of entire composite construction 11 can be easily controlled.

Thus, it is made possible to exert such a specific effect due to a structural control as to impart a residual compressive stress to the shell layer 18 by a difference between the amount of the bonding phase 13 in the core material 14 and the amount of the bonding phase 17 in the shell layer 18, and thus making it possible to easily control characteristics such as combination of high hardness and high toughness and combination of high strength and high thermal conductivity.

The material best suited for use in the intermediate layer 19 is at least one kind of metals having low wettability with the bonding phases 13, 17 contained in the core material 14 and the shell layer 18, as compared with the crystal grains 12, 16 contained in the core material 14 and shell layer 18, and low diffusion coefficient, or carbides, nitrides, carbonitrides, borides and oxides thereof, and particularly at least one kind of carbides, nitrides, carbonitrides and borides. For example, in case the core material 14 and/or the shell layer 18 are made of WC—Co, the intermediate layer 19 preferably contains at least one kind of metal elements selected from the group consisting of Ti, Zr, Hf, V, Nb and Ta, and particularly preferably one, two or more kinds of metal Ti, carbides, nitrides, carbonitrides and borides.

The component constituting the intermediate layer 19 may contain, as a main component, metal elements different from those of the crystal grains 12, 16 contained in the core material 14 and the shell layer 18, or metal elements contained as a subsidiary component in the core material 14 and/or the shell layer 18. As used herein, the main component refers to a component contained in an amount of 50 atm % or more based on the total metal amount of the hard sintered body which constitutes the core material 14 and the shell layer 18, while the subsidiary component refers to a component contained in an amount of 40 atm % or less, preferably 20 atm % or less, and more preferably 10 atm % or less, based on the total metal amount of the hard sintered body which constitutes the core material 14 and the shell layer 18.

The material suited for use in the intermediate layer 19 is at least one kind of metals having a melting point or a temperature at which a liquid phase appears, which is lower than a melting point of the bonding phases 13, 17 contained in the core material 14 and the shell layer 18, and preferably high reactivity with the core material 14 and the shell layer 18, or carbides, nitrides, carbonitrides, borides and oxides thereof For example, in case the core material 14 and/or the shell layer 18 is made of WC—Co, the intermediate layer 19 is preferably made of metal Al or metal Si. With the above constitution, even if the bonding phases 13,17 in the core material 14 and the shell layer 18 is converted into a liquid phase, when at least one portion of the intermediate layer 19 is converted into a liquid phase, diffusion of the liquid phase into the opposite side can be prevented. In case the reaction product is previously produced by reacting the liquid phase of the intermediate layer 19 with the component of the core material 14 and/or the shell layer 18, diffusion of the liquid phase of the bonding phases 13, 17 can be prevented.

When using metals such as metal Ti, metal Al and metal Si as the intermediate layer 19, a portion or all of them are preferably converted into at least one kind of compounds selected from the group consisting of carbides, nitrides and carbonitrides, for example, one kind selected from the group consisting of TiC, TiCN, TiN, $Si_3N_4$, SiC and AlN. In view of the plastic deformation resistance, all of them are preferably converted into compounds. In case the heat resistance or conductivity is imparted, at least one portion of the metal is preferably remained.

The average particle diameter of the particles constituting the intermediate layer 19 is preferably larger than that of the crystal grains constituting the core material 14 and the shell layer 18, which contain the bonding phases 13, 17, in order to prevent impregnation of the bonding phases 13, 17 of the core material 14 and the shell layer 18 into the intermediate layer 19 due to a capillary phenomenon. Particularly, a ratio of the an average particle diameter ($d_3$) of the crystal grains 12 of the core material 14 or the crystal grains 16 of the shell layer 18 (smaller average particle diameter in case the bonding phases 13, 17 exist in the both) to the average particle diameter ($d_4$) of the particles of the intermediate layer 19, ($d_4/d_3$), is preferably within a range from 1.1 to 5, and particularly preferably from 2.5 to 4.

Furthermore, any one kind of composite compounds of the crystal grains 12, 16 contained in the core material 14 and/or the shell layer 18 and the metal component contained in the intermediate layer 19, particularly composite carbides, composite nitrides and composite carbonitrides, preferably exists at the interface between the core material 14 and/or the shell layer 18 and the intermediate layer 19. Consequently, a bonding force between the core material 14 and/or the shell layer 18 and the intermediate layer 19 can be enhanced.

In order to impart desired characteristics to the composite construction 11 by controlling characteristics of the core material 14 and the shell layer 18 to the desired characteristics, in case a proportion of the shell layer 18 based on entire composite construction 11 is lower than that of the core material 14, a ratio of the average thickness $D_3$ of the intermediate layer 19 to the average thickness $D_4$ of the shell layer 18, ($D_3/D_4$), is preferably within a range from 0.01 to 0.5, and particularly preferably from 0.05 to 0.2.

According to the present invention, the core material 14 and/or the shell layer 18 may be made of ceramics or cermets capable of causing liquid phase sintering, and the crystal grains 12, 16 are preferably made of at least one kinds of hard particles selected from the group consisting of metal carbides, metal nitrides, metal carbonitrides, diamonds and cubic boron nitride (provided that the metal element (M) constituting the metal carbides, metal nitrides and metal carbonitrides is at least one kind selected from the group consisting of metals of Group 4a, 5a and 6a of the Periodic Table) and the bonding phases 13, 17 are preferably made of iron group metals, particularly preferably Co and/or Ni. One of the core material 14 and the shell layer 18 may be formed by solid phase sintering in which no liquid phase is produced.

Figure 6A:
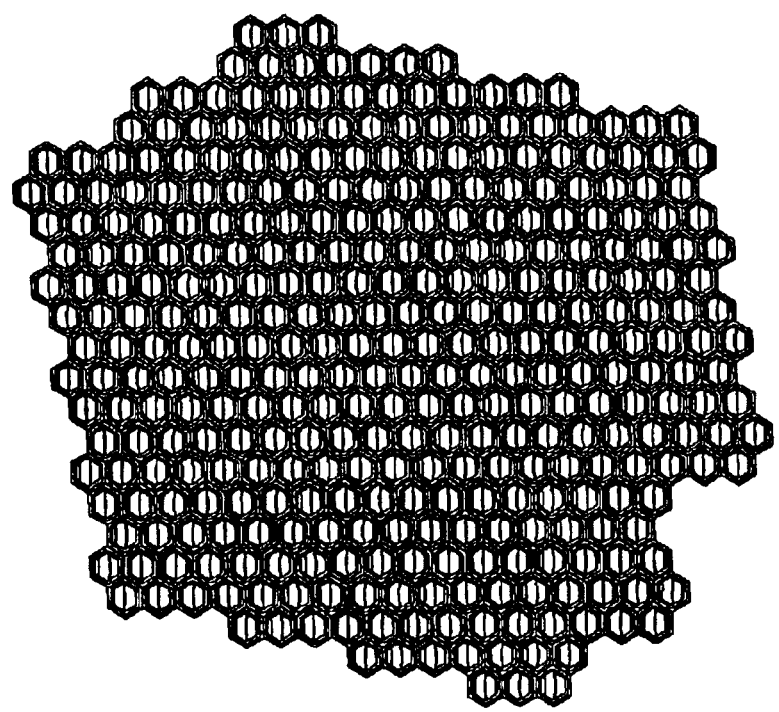
FIG. 6(a) and FIG. 6(b) are schematic sectional views showing another embodiment of the second composite construction according to the present invention.
Figure 6B:
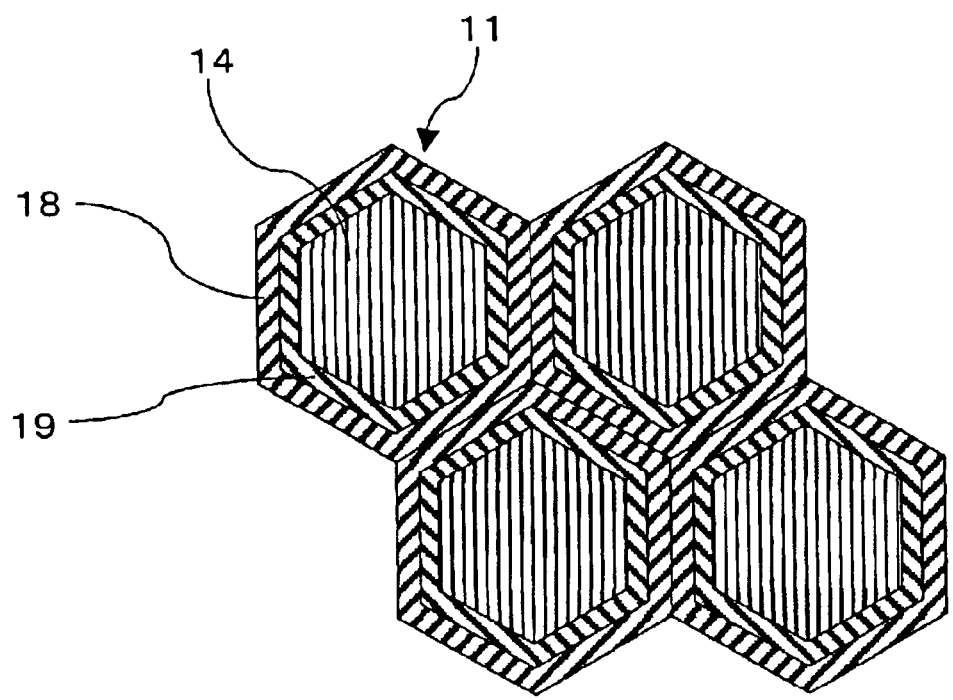

Although the case wherein the outer periphery of one core material 14 is coated with the shell layer 18 was illustrated with reference to FIG. 5, the present invention is not limited to the case and, as shown in FIG. 6, the composite construction 11 may be a composite construction having a multi-filament structure wherein plural (for example, four or more) composite constructions shown in FIG. 5 are bound into a bundle.

(Manufacturing Method)

Figure 7:
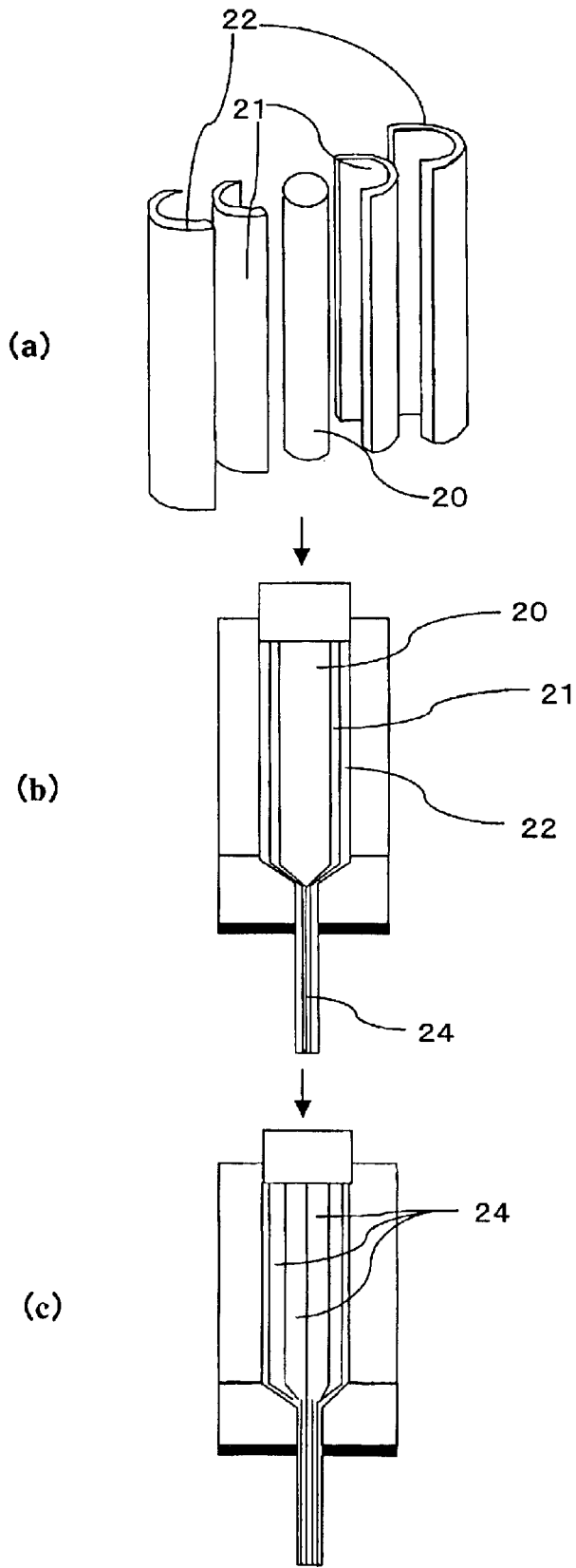
FIG. 7 is a process chart for explaining a method of manufacturing the second composite construction according to the present invention.

The method of manufacturing a second composite construction according to the present invention will be described by way of the case wherein the core material and the shell layer contain an iron group metal as a bonding phase with reference to the process chart shown in FIG. 7.

First, 50 to 98% by weight of a hard powder having an average particle diameter of 0.01 to 3.5 μm or a crystal grain-forming component is mixed with 20 to 50% by weight or less of an iron group metal powder having an average particle diameter 10 μm or less and an organic binder such as paraffin wax, polystyrene, polyethylene, ethylene-ethyl acrylate, ethylene-vinyl acetate, polybutyl methacrylate, polyethylene glycol or dibutyl phthalate is added to the mixture. After kneading the mixture, a cylindrical green body 20 for core material is formed from the kneaded mixture by a forming method such as pressing, extrusion or slip casting (see step (a)).

Furthermore, 50 to 98% by weight of crystal grains having an average particle diameter 0.01 to 10 μm or a crystal grains-forming component is mixed with 2 to 50% by weight of an iron group metal powder having an average particle diameter of 10 μm or less and the above-mentioned binder was added. After kneading the mixture, two half-cut cylindrical green bodies 22 for shell layer are formed from the kneaded mixture by a forming method such as pressing, extrusion or slip casting (see step (a)).

Also the above-mentioned binder is added to the above-mentioned raw powder for forming an intermediate layer having an average particle diameter within a range from 0.01 to 10 μm, for example, at least one kind selected from the group consisting of particles of Si, Al and metals of Group 4a, 5a and 6a of the Periodic Table, and carbides, nitrides and carbonitrides thereof. After kneading the mixture, two half-cut cylindrical green bodies 21 for intermediate layer are formed from the kneaded mixture by a forming method such as pressing, extrusion or slip casting and a composite green body comprising the green bodies 21 for intermediate layer and the green body 22 for shell layer in order disposed to cover the outer periphery of the green body 20 for core material, is formed (see step (a)).

According to the present invention, there can be appropriately used a method of preparing a slurry for intermediate layer and dipping a green body for core material in the slurry, a method of preparing a solution for forming an intermediate layer and spraying the solution over the surface of a green body for core material and a method of winding a metal foil for forming an intermediate layer in place of manufacturing the above-mentioned intermediate layer (also green body for shell layer, if necessary).

The composite green body is co-extruded to form a stretched composite green body 24 having a fine diameter, wherein the outer periphery of the core material 20 is coated with the green body 21 for intermediate layer and the green body 22 for shell layer(see step (b)). To manufacture a construction having a multi-filament structure, plural co-extruded continuous green bodies may be co-extruded again after binding into a bundle (see step (c)).

Furthermore, in the same manner as in case of the above-mentioned first composite construction, the stretched continuous green body can be formed into a cylindrical shape or a prism shape, if necessary, and a laminate can be manufactured by arranging the continuous green bodies to form a sheet and laminating plural sheets. Also the continuous green body can be formed into arbitrary shape by a forming method such as known rapid proto-typing method. Furthermore, the sheet obtained by the arrangement or a composite construction sheet obtained by slicing the sheet in a cross-sectional direction can be laminated or bonded to the surface of a hard alloy sintered body (bulk body) such as conventional cemented carbide.

The composite construction of the present invention can be manufactured by subjecting the green body to a binder burn-out treatment and then to sintering. As the sintering method, for example, vacuum sintering, gas pressure sintering, hot press, spark plasma sintering and ultrahigh pressure sintering methods can be used according to the kinds of the core material and the shell layer. The sintering temperature is preferably controlled within a range from 1200 to 1800° C.

Although the core material and the shell layer were made of the sintered body obtained by bonding hard particles with the bonding phase in the above-mentioned method, the present invention is not limited to the case and any one of the core material and the shell layer is made of only metal, or may be solid phase sintering, that is, the case free from bonding phase.

EXAMPLES
(First Composite Construction)

Example 1–9 and Comparative Example 1–3

85 to 100% by weight of diamond particles having an average particle diameter shown in Table 1 were mixed with 0 to 20% by weight of a Co powder having an average particle diameter of 2 μm and a binder and a lubricant were added to the mixture. After kneading the mixture, the kneaded mixture was pressed to form a green body for core material having a diameter of 20 mm.

Furthermore, 80 to 95% by weight of a hard particle powder shown in Table 1 was mixed with 5 to 20% by weight of a cobalt powder having an average particle diameter of 2 μm and a binder and a lubricant were added to the mixture. After kneading the mixture, the kneaded mixture was pressed to form two half-cut cylindrical green bodies for shell layer, each having a wall thickness of 1 mm and then a composite green body was formed by coating the outer periphery of the green body for core material with the half-cut cylindrical green bodies for shell layer.

The composite green body was co-extruded to form a stretched composite green body and 100 stretched composite green bodies were co-extruded again after binding into a bundle to form a green body having a multi-filament structure. The green body was subjected to a binder burn-out treatment, set in an ultrahigh pressure apparatus and then sintered at a pressure of 5 GPa under the temperature conditions shown in Table 1 to manufacture a composite construction.

With respect to each of the resulting composite constructions, Vickers hardness (in accordance with JISR1601) and the toughness (in accordance with IF method) of each sample were measured. With respect to the polishing cross section of each sample, wave length dispersive X-ray spectroscopy was carried out and a comparison in an average value of the total amount of a peak intensity of the iron group metal between the core material and the shell layer was made. The conditions of wave length dispersive X-ray spectroscopy are as follows: an acceleration voltage is 15 kV, a probe current is $3\times10^{-7}$ A and a spot size is 2 μm. The results are shown in Table 1.

TABLE 1

| | | Core material (Starting materials for Diamond) | | Shell layer (Starting materials) | | | | | |
|---|---|---|---|---|---|---|---|---|---|
| | | | | Hard particles | | | | | |
| | | Grain size (μm) | Co Amount (wt %) | Amount (wt %) | A kind of hard particles | Grain size (μm) | Amount (wt %) | Co Amount (wt %) | Sintering condition |
| | | | | | | | | | Temperature (° C.) | Time (min) |
| Comp. Example | 1 | 10 | 90 | 10 | WC | 10 | 90 | 10 | 1350 | 15 |
| | 2 | 1 | 90 | 10 | WC | 1 | 90 | 10 | 1350 | 15 |
| | 3 | 1 | 80 | 20 | WC | 1 | 80 | 20 | 1350 | 15 |
| Example | 1 | 0.05 | 85 | 15 | WC | 10 | 90 | 10 | 1400 | 15 |
| | 2 | 0.5 | 90 | 10 | WC | 5 | 90 | 10 | 1450 | 15 |
| | 3 | 2 | 90 | 10 | WC | 5 | 90 | 10 | 1400 | 15 |
| | 4 | 3 | 100 | — | WC | 5 | 90 | 10 | 1500 | 15 |
| | 5 | 4 | 90 | 10 | WC | 5 | 90 | 10 | 1400 | 30 |
| | 6 | 10 | 92 | 8 | WC | 5 | 95 | 5 | 1350 | 5 |
| | 7 | 10 | 90 | 10 | WC | 10 | 95 | 5 | 1400 | 15 |
| | 8 | 1.5 | 85 | 15 | WC | 2 | 90 | 10 | 1500 | 15 |
| | 9 | 3.5 | 90 | 10 | WC TiC | 5 2 | 90 | 10 | 1400 | 15 |

| | Comparison of amount of iron group metal | $d_1/d_2$ | Hardness (GPa) | Fracture toughness (MPa √m) | Interface state |
|---|---|---|---|---|---|
| Comp. Example | = | 1 | 58 | 12 | Partially delamination |
| | = | 0.9 | Delamination | Delamination | Fine delamination |
| Example | = | 0.9 | 40 | 16 | good |
| | > | 0.006 | 53 | 20 | good |
| | > | 0.15 | 51 | 22 | good |
| | > | 0.47 | 54 | 20 | good |

TABLE 1-continued

| | | | | |
|---|---|---|---|---|
| > | 0.7 | 58 | 20 | good |
| > | 0.87 | 62 | 21 | good |
| > | 2.5 | 70 | 18 | good |
| > | 1.5 | 65 | 18 | good |
| > | 0.8 | 55 | 21 | good |
| > | 0.83 | 60 | 20 | good |

As is apparent from the results of Table 1, regarding Comparative Example 1 and Comparative Example 2 wherein the content of Co as the iron group metal in the core material is the same as that of Co in the shell layer and the total amount of Co is small, Comparative Example 1 having a large diamond particle diameter exhibited high hardness such as 58 GPa but exhibited low fracture toughness such as 12 MPa√m, while the measurement could not carried out because of delamination indentation in Comparative Example 2 having a small diamond particle diameter. Comparative Example 3, wherein the content of Co in the core material is the same as that of Co in the shell layer and the total amount of Co is large, exhibited high fracture toughness of 16 MPa√m, but exhibited low hardness such as 40 GPa.

Regarding Example 1 to Example 9 wherein the content of the iron group metal in the core material is larger than that of the iron group metal in the shell layer in accordance with the present invention, all samples exhibited excellent characteristics such as hardness of 50 GPa or more and toughness of 18 MPa√m or more.

The size in the constructions of Example 1 to Example 9 was measured using a scanning electron microscope. As a result, the core material had an average diameter within a range from 140 to 160 μm and the shell layer had an average thickness within a range from 8 to 12 μm. The content of Co in the sintered body after transfer of Co is described in the column of the "comparison of amount of iron group metal". In the column of the "comparison of amount of iron group metal", the symbol "=" denotes that the content of Co in the core material is as the same as that of Co in the shell layer, while the symbol ">" denotes that the content of Co in the core material is larger than that of Co in the shell layer.

(Second Composite Construction)

Example 10

95% by weight of diamond particles having an average particle diameter of 2 μm were mixed with 5% by weight of a Co powder having an average particle diameter of 2 μm and a binder and a lubricant were added to the mixture. After kneading the mixture, the kneaded mixture was pressed to form a green body for core material having a diameter of 18 mm.

Furthermore, 90% by weight of a WC powder having an average particle diameter of 3 μm was mixed with 10% by weight of a Co powder having an average particle diameter of 2 μm and a binder and a lubricant were added to the mixture. After kneading the mixture, the kneaded mixture was pressed to form two half-cut cylindrical green bodies for shell layer, each having a wall thickness of 0.8 mm.

To a $TiC_{0.6}$ (titanium carbide having a small carbon content) powder having an average particle diameter of 5 μm, a binder and a lubricant were added. After kneading the mixture, the kneaded mixture was pressed to form two half-cut cylindrical green bodies for intermediate layer, each having a wall thickness of 0.2 mm.

Then, a composite green body was formed by coating the outer periphery of the green body for core material with the green body for intermediate layer and the green body for shell layer in order.

The composite green body was co-extruded to form a stretched composite green body and 100 stretched composite green bodies were co-extruded again after binding into a bundle to form a green body having a multi-filament structure. The green body was subjected to a binder burn-out treatment, set in an ultrahigh pressure apparatus and then sintered at a temperature of 1500° C. under a pressure of 5 GPa to manufacture a composite construction.

With respect to each of the resulting composite construction, Vickers hardness (in accordance with JISR1601) was measured. As a result, it was 62 GPa.

Figure 8:
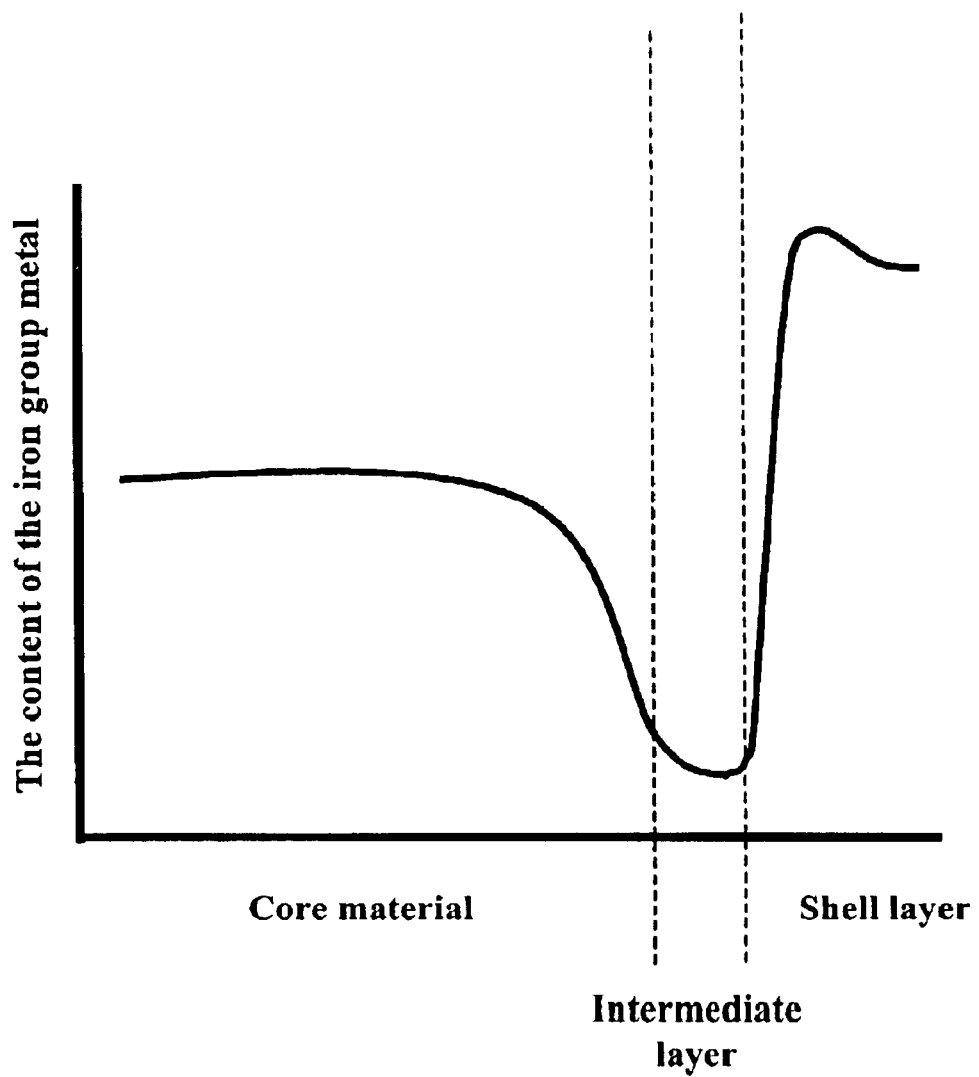
FIG. 8 is a graph showing the results of wave length dispersive X-ray spectroscopy of a composite green body of Example 10 according to the present invention.

With respect to the polishing cross section of each sample, SEM observation was carried out. As a result, it was a sound sintered body wherein the core material and the shell layer are free from pores. Furthermore, wave length dispersive X-ray spectroscopy revealed a distribution wherein the Co content gradually decreases toward the intermediate layer from the core material and the shell layer, as shown in FIG. 8. The conditions of wave length dispersive X-ray spectroscopy are as follows: an acceleration voltage is 15 kV, a probe current is $3\times10^{-7}$ A and a spot size is 2 μm. The XRD diffraction pattern of the intermediate layer revealed that the intermediate layer is made of TiC.

Comparative Example 4

In the very same manner as in Example 10, except that the intermediate layer was not provided, a composite construction was manufactured and evaluated in the same manner. As a result, Vickers hardness was 46 GPa. Wave length dispersive X-ray spectroscopy analysis revealed that a large amount of Co diffused toward the shell layer from the core material.

Example 11

50% by weight of cBN particles having an average particle diameter of 3 μm, 45% by weight of TiN particles having an average particle diameter of 3 μm and 5% by weight of an Al powder having an average particle diameter of 8 μm were mixed and a binder and a lubricant were added to the mixture. After kneading the mixture, the kneaded mixture was pressed to form a green body for core material having a diameter of 18 mm.

Furthermore, 60% by weight of a TiCN powder having an average particle diameter of 1 μm, 20% by weight of a $Mo_2C$ powder having an average particle diameter of 3.5 μm, 10% by weight of a Ni powder having an average particle diameter of 2 μm and 10% by weight of a Co powder having an average particle diameter of 3 μm were mixed and a binder and a lubricant were added to the mixture. After kneading the mixture, the kneaded mixture was pressed to form two half-cut cylindrical green bodies for shell layer, each having a wall thickness of 0.8 mm.

To a Ti powder and an Al powder, each having an average particle diameter of 10 μm, a binder and a lubricant were added. After kneading the mixture, the kneaded mixture was pressed to form two half-cut cylindrical green bodies for intermediate layer, each having a wall thickness of 0.2 mm.

In the same manner as in Example 10, a green body having a multi-filament structure was formed. In the same manner, the green body was subjected to a binder burn-out treatment, set in an ultrahigh pressure apparatus and then sintered at a temperature of 1400° C. under a pressure of 5 GPa to manufacture a composite construction.

With respect to each of the resulting composite construction, Vickers hardness was measured under the same conditions as in Example 10. As a result, it was 26 GPa. Wave length dispersive X-ray spectroscopy analysis revealed that the total content of Ni and Co gradually decreases toward the intermediate layer from the shell layer. The XRD diffraction pattern revealed that the intermediate layer is made of a mixed phase of TiN, $TiB_2$ and AlN.

Comparative Example 5

In the very same manner as in Example 11, except that the intermediate layer was not provided, a composite construction was manufactured and evaluated in the same manner. As a result, Vickers hardness was 20 GPa. Wave length dispersive X-ray spectroscopy analysis revealed that a large amount of Ni and Co diffused toward the core material from the shell layer.

Example 12

60% by weight of a TiC powder having an average particle diameter of 1 μm, 20% by weight of a $Mo_2C$ powder having an average particle diameter of 3 μm and 20% by weight of a Ni powder having an average particle diameter of 2 μm were mixed and a binder and a lubricant were added to the mixture. After kneading the mixture, the kneaded mixture was pressed to form a green body for core material having a diameter of 18 mm.

Furthermore, 90% by weight of a WC powder having an average particle diameter of 1 μm was mixed with 10% by weight of Co powder having an average particle diameter of 2 μm and a binder and a lubricant were added to the mixture. After kneading the mixture, the kneaded mixture was pressed to form two half-cut cylindrical green bodies for shell layer, each having a wall thickness of 0.9 mm.

To a Si powder having an average particle diameter of 10 μm, a binder, a lubricant and a solvent were added to prepare a slurry, and then the outer periphery of the core material was coated with the slurry which forms a green body for intermediate layer having a wall thickness of 0.1 mm. The outer periphery of the green body for core material coated with the green body for intermediate layer was coated with the green body for shell layer to form a composite green body. Then, a green body having a multi-filament structure was formed in the same manner as in Example 10. The green body was subjected to a binder burn-out treatment and sintered at a temperature of 1500° C. to manufacture a composite construction.

The resulting sintered body was observed. As a result, it was a sound sintered body free from pores wherein the core material and the shell layer have a porosity of less than A02. The XRD diffraction pattern revealed that the intermediate layer is made of SiC.

Comparative Example 6

In the same manner as in Example 12, except that the intermediate layer was not formed, a composite construction was manufactured and observed. As a result, a large number of large pores are remained and the shell layer has a porosity of B06 to B08.

Example 13

94.5% by weight of a WC powder having an average particle diameter of 1 μm, 0.5% by weight of a VC powder having an average particle diameter of 3 μm and 5% by weight of a Co powder having an average particle diameter of 3 μm were mixed and a binder and a lubricant were added to the mixture. After kneading the mixture, the kneaded mixture was pressed to form a green body for core material having a diameter of 18 mm.

Furthermore, 60% by weight of a WC powder having an average particle diameter of 1 μm, 20% by weight of a TiC powder having an average particle diameter of 3 μm, 5% by weight of a VC powder having an average particle diameter of 3 μm and 15% by weight of a Co powder having an average particle diameter of 3 μm were mixed and a binder and a lubricant were added to the mixture. After kneading the mixture, the kneaded mixture was pressed to form two half-cut cylindrical green bodies for shell layer, each having a wall thickness of 0.8 mm.

To a Ti powder having an average particle diameter of 10 μm, a binder and a solvent were added to prepare a solution, and then the solution, which forms a green body for intermediate layer having a wall thickness of 0.2 mm, was sprayed over the outer periphery of the core material. The outer periphery of the green body for core material coated with the green body for intermediate layer was coated with the green body for shell layer to form a composite green body. Then, a green body having a multi-filament structure was formed in the same manner as in Example 10. The green body was subjected to a binder burn-out treatment and sintered at a temperature of 1450° C. to manufacture a composite construction.

The resulting sintered body was subjected to wave length dispersive X-ray spectroscopy analysis. Wave length dispersive X-ray spectroscopy analysis revealed that the Co content in the core material is 5% by weight and the Co content in the shell layer is 15% by weight and there is no diffusion between them, and that the Co content gradually decreased toward the intermediate layer from the core material and the shell layer in a certain region. The XRD diffraction pattern revealed that the intermediate layer is made of TiC.

Comparative Example 7

In the same manner as in Example 13, except that the intermediate layer was not formed, a composite construction was manufactured and observed. As a result, Co diffused into the core material and the shell layer, distribution of Co is uniformly in the core material and the shell layer.

What is claimed is:

1. A composite construction comprising a continuous core material made of a polycrystalline diamond (PCD) obtained by bonding diamond particles with an iron group metal; and a shell layer made of a sintered body obtained by bonding at least one kind of hard particles, which are selected from the group consisting of carbides, nitrides and carbonitrides of at least one kind of metal elements (M) selected from the group consisting of metals of Group 4a, 5a and 6a of the Periodic Table, with an iron group metal, the outer periphery of the core material being coated with the shell layer; wherein an amount of the iron group metal in the core material is larger than that of the iron group metal in the shell layer.

2. The composite construction according to claim 1, wherein an average particle diameter $d_1$ of the diamond particles is 3.5 μm or less.

3. The composite construction according to claim 1, wherein a ratio of an average particle diameter $d_1$ of the diamond particles to an average particle diameter $d_2$ of the hard particles, $(d_1/d_2)$, is within a range from 0.001 to 1.0.

4. The composite construction according to claim 1, wherein the content of the iron group metal gradually decreases toward the shell layer from the core material.

5. The composite construction according to claim 1, further comprising at least one intermediate layer, which prevents diffusion of the iron group metal toward one of the core material and the shell layer to the other one, provided between the core material and the shell layer.

6. The composite construction according to claim 1, further comprising at least one intermediate layer, which has a region in which the content of the iron group metal gradually decreases toward the inside from at least one of the core material and the shell layer, provided between the core material and the shell layer.

7. The composite construction according to claim 1, wherein a ratio of an average diameter $D_1$ of the core material to an average thickness $D_2$ of the shell layer, $D_2/D_1$ is within a range from 0.01 to 0.5.

8. A composite construction having a multi-filament structure, comprising plural composite constructions of claim 1, which are bound into a bundle.

9. A composite construction comprising a continuous core material; and a shell layer having a composition different from that of the core material, the outer periphery of the core material being coated with the shell layer; wherein at least one of the core material and the shell layer is made of a sintered body obtained by bonding crystal grains with a bonding phase and at least one intermediate layer, which has a region in which the content of the bonding phase gradually decreases toward the inside from at least one of the core material and the shell layer, is provided between the core material and the shell layer.

10. The composite construction according to claim 9, wherein the crystal grains are made of at least one kind of hard particles selected from metal carbides, metal nitrides, metal carbonitrides, diamonds and cubic boron nitrides (provided that the metal element (M) constituting the metal carbides, metal nitrides and metal carbonitrides is at least one kind selected from the group consisting of metals of Group 4a, 5a and 6a of the Periodic Table).

11. The composite construction according to claim 9, wherein the bonding phase is made of the iron group metal.

12. The composite construction according to claim 9, wherein the intermediate layer contains a metal element, which is different from that of the crystal grains contained in the core material and the shell layer, selected from the group consisting of metals of Groups 4a, 5a and 6a of the Periodic Table, Si and Al.

13. The composite construction according to claim 9, wherein the intermediate layer contains, as a main component, a metal element selected from the group of metals of Group 4a, 5a and 6a of the Periodic Table contained as a subsidiary component in the core material and the shell layer, which contain the bonding phase.

14. The composite construction according to claim 9, wherein an average particle diameter of particles constituting the intermediate layer is larger than that of crystal grains constituting at least one of the core material and the shell layer, which contain the bonding phase.

15. The composite construction according to claim 9, wherein a composite compound of a metal component contained in at least one of the core material and the shell layer and a metal component contained in the intermediate layer exists at an interface between at least one of the core material and the shell layer and the intermediate layer.

16. The composite construction according to claim 15, wherein the composite compound is at least one kind of composite carbides, composite nitrides and composite carbonitrides.

17. The composite construction according to claim 9, wherein a ratio of an average thickness $D_3$ of the intermediate layer to an average thickness $D_4$ of the shell layer, $D_3/D_4$ is within a range from 0.01 to 0.5.

18. A composite construction having a multi-filament structure, comprising plural composite constructions of claim 9, which are bound into a bundle.

* * * * *